United States Patent
Wester et al.

(10) Patent No.: US 8,842,219 B2
(45) Date of Patent: Sep. 23, 2014

(54) FRAME RATE UP-CONVERSION

(75) Inventors: Rogier Wester, Waarle (NL); Patrick Meijers, Puth (NL)

(73) Assignee: Entropic Communications, Inc., San Diego, CA (US)

( * ) Notice: Subject to any disclaimer, the term of this patent is extended or adjusted under 35 U.S.C. 154(b) by 237 days.

(21) Appl. No.: 13/060,389

(22) PCT Filed: Jul. 17, 2009
(Under 37 CFR 1.47)

(86) PCT No.: PCT/IB2009/053110
§ 371 (c)(1),
(2), (4) Date: Oct. 5, 2011

(87) PCT Pub. No.: WO2010/010497
PCT Pub. Date: Jan. 28, 2010

(65) Prior Publication Data
US 2012/0099017 A1    Apr. 26, 2012

(30) Foreign Application Priority Data
Jul. 23, 2008 (EP) .................................... 08104851

(51) Int. Cl.
H04N 7/01 (2006.01)
H04N 11/20 (2006.01)
H04N 3/27 (2006.01)
H04N 7/12 (2006.01)
H04N 11/02 (2006.01)
H04N 11/04 (2006.01)

(52) U.S. Cl.
USPC ...... 348/441; 348/459; 348/554; 375/240.12; 375/240.16

(58) Field of Classification Search
None
See application file for complete search history.

(56) References Cited

U.S. PATENT DOCUMENTS

| | | | | |
|---|---|---|---|---|
| 2004/0252759 | A1* | 12/2004 | Winder et al. | 375/240.12 |
| 2005/0134735 | A1* | 6/2005 | Swartz | 348/554 |
| 2005/0243932 | A1* | 11/2005 | Landsiedel et al. | 375/240.16 |
| 2008/0030614 | A1* | 2/2008 | Schwab et al. | 348/441 |
| 2008/0151109 | A1* | 6/2008 | Doswald | 348/459 |

FOREIGN PATENT DOCUMENTS

WO    2007129257    11/2007

OTHER PUBLICATIONS

Bellers et al., "Efficient Architecture for full HD 120 Hz Frame Rate Conversion", Consumer Electronics, ICCE 2008, Digest of Technical Papers, International Conference on, IEEE, Piscataway, NJ, USA, Jan. 9, 2008, pp. 1-2, XP031297442, ISBN 978-1-4244-1458-1.

* cited by examiner

*Primary Examiner* — Jefferey Harold
*Assistant Examiner* — Sean Haiem
(74) *Attorney, Agent, or Firm* — Richard Bachand; Bruce Greenhaus; Duane Morris LLP

(57) ABSTRACT

Content comprising a sequence of original frames at a first frame rate is up-converted to a second, higher, frame rate. Intermediate frames are calculated for temporal positions spaced between temporal positions of the original frames. An output sequence at the second frame rate comprises a repeating pattern of frames and, within each repetition of the pattern, there is: at least one original frame; at least one intermediate frame which is repeated; and at least one frame which is not repeated. The method is suitable for applications where an up-conversion factor is required in the frame rate, such as an up-conversion factor of five to up-convert from the 24 Hz frame rate used for film-based content to the 120 Hz frame rate used by displays. The output sequence can use all of the original frames to reduce detail flicker.

11 Claims, 6 Drawing Sheets

FRAME RATE UP-CONVERSION

PRIORITY INFORMATION

This patent application claims priority from PCT patent application PCT/IB2009/053110 filed Jul. 17, 2009, which claims priority to EP patent application 08104851.4 filed Jul. 23, 2008, both of which are hereby incorporated by reference.

BACKGROUND OF THE INVENTION

This invention relates to converting the frame rate of content to a higher frame rate.

A range of different frame rates are used in the distribution and display of content. Film-based content (e.g. made-for-cinema films) typically has a frame rate of 24 Hz. Video content, such as made-for-television content, typically has a frame rate of 50 Hz or 60 Hz. A frame rate of 50 Hz or 60 Hz is typically used for the distribution of content, such as broadcast systems and recorded media.

Content with a frame rate of 24 Hz can be up-converted to the 60 Hz frame rate used for distribution by a process known as 3:2 pulldown (also known as 2:3 pulldown). This is shown in FIG. 1. An original sequence of film frames A-E at a rate of 24 Hz is shown on the upper line. The lower line shows a sequence of frames output at 60 Hz. Frames A, C and E are each shown three times, while frames B and D are each shown twice. Each frame in the pulldown sequence is a copy of the original frame. The 3:2 pulldown sequence gives a rate of 2.5 times the original frame rate, i.e. 2.5×24 Hz=60 Hz. However, the repetition of frames, and uneven rate at which frames are repeated, can be noticed by a viewer as moving objects do not follow their correct temporal position. This deficiency is known as motion judder.

Many displays now use a higher frame rate of 100 Hz or 120 Hz in order to reduce motion blur. The input content can be video content at a rate of 50/60 Hz or film content, which can either be received at a rate of 24/25/30 Hz or at a rate of 50/60 Hz, with the original 24 Hz frame rate having been up-converted to 50 Hz/60 Hz. The problem of up-converting film content which originated at 24 Hz, and which needs to be displayed at a higher rate of, for example, 120 Hz will be addressed here.

FIG. 2 shows one possible way of up-converting film-based content from 24 Hz to 120 Hz. In FIG. 2 time is shown along the horizontal axis and the position of a moving object is shown along the vertical axis. Straight line 20 indicates the true path of the moving object. At time t=0 the object is at the position labelled A, in frame A. At time t=1, the object is at the position labelled B, in frame B. The original frames A, B of the film (i.e. the original frames which occurred at the 24 Hz rate) are extracted and displayed. Motion estimation and motion-compensation techniques are then applied to calculate four intermediate frames I1-I4. For example, interpolation techniques can be used to calculate the intermediate frames by using the original frames A and B. The position of the object, as calculated at the times 0.2, 0.4, 0.6, 0.8, is also shown. As the objects lie on a straight line 20 between the two original positions A, B the viewer sees a smooth moving object. While the method shown in FIG. 2 can provide a smooth output at the higher frame rate, it can require significant hardware resources and may require an unacceptably long processing time (high video latency). This can make the technique unsuitable for certain applications, especially where a rendering device has limited resources such as memory, memory bandwidth, processing budget and power (e.g. battery life).

FIG. 3 shows another possible way of up-converting the frame rate of film content to 120 Hz which requires fewer resources of a rendering device. Motion compensated processing up-converts the frame rate to 60 Hz and then each generated frame at the 60 Hz rate is repeated, to give the output frame rate of 120 Hz. In FIG. 3, original frame A is displayed at t=0 and again at t=0.2. A first intermediate frame I1, calculated with the temporal position of the object at t=0.4, is output at t=0.4 and t=0.6. A second intermediate frame I2, calculated with the temporal position of the object at time t=0.8, is output at t=0.8 and t=1.0. This allows up-conversion with less resources, and lower latency. A drawback is that the moving object is not perceived as sharply (motion blur). Another drawback is that one out of every two original frames cannot be shown. In this example, frame B is lost because the object in frame B is at the wrong temporal position. Another drawback is that high frequencies at high contrast are perceived to flicker. The sharp originals and less sharp interpolated objects flicker at the low repeat frequency (12 Hz).

The present invention seeks to overcome at least one of these disadvantages.

SUMMARY OF THE INVENTION

Accordingly, a first aspect of the present invention provides a method of increasing the frame rate of content, the content comprising a sequence of original frames at a first frame rate, the method comprising:

receiving the original frames;

calculating intermediate frames for temporal positions spaced between the temporal positions of the original frames;

outputting a sequence of frames at a second frame rate, higher than the first frame rate, wherein the output sequence comprises a repeating pattern of frames and, within each repetition of the pattern, there is:

at least one original frame;

at least one intermediate frame which is repeated; and, at least one of the frames is not repeated.

Embodiments of the invention have an advantage of providing an output at the second frame rate which offers a higher quality viewing experience compared to methods which repeat every frame, while also having an advantage of requiring less resources (e.g. processing budget, memory, power) compared to methods which calculate a full set of intermediate frames.

Embodiments of the present invention are particularly advantageous for applications where an odd up-conversion factor, such as an up-conversion factor of five, is required in the frame rate (i.e. output frame rate is five times higher than the input frame rate). This has a particularly advantageous application in up-converting film-based content from a 24 Hz frame rate to the 120 Hz frame rate used by displays, although the invention is not limited to up-converting film-based content.

In some embodiments, the step of outputting a sequence of frames outputs all of the original frames, which can reduce the amount of computation required to calculate intermediate frames, and can reduce the visibility of detail flicker to a viewer.

The original frames can be received as an input stream at the first rate (e.g. a 24 Hz stream where every frame is an original frame). Alternatively, the original frames may be received as a stream at a rate which is higher than the first rate, such as a 60 Hz stream which has been created by a 3:2 pulldown process.

Further aspects of the invention provides apparatus for performing the method and software for performing the method. The software can be provided as computer-executable code which is tangibly embodied on an electronic memory device, hard disk, optical disk or any other machine-readable storage medium or it can be downloaded to a processing device via a network connection.

These and other objects, features and advantages of the present invention will become more apparent in light of the following detailed description of preferred embodiments thereof, as illustrated in the accompanying drawings.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
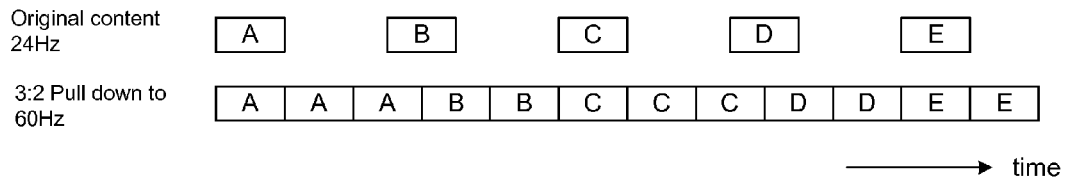
FIG. 1 shows a 3:2 pulldown technique for converting the frame rate of film-based content.
Figure 2:
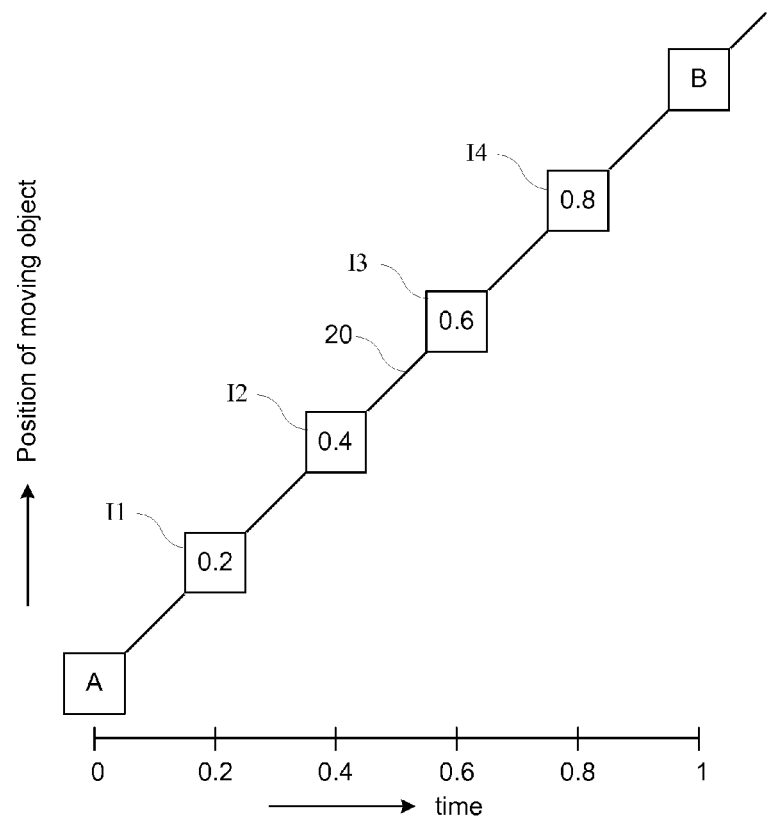
FIG. 2 shows a technique of up-converting the frame rate of film content by calculating an intermediate frame at each intermediate time a frame should be displayed between original frames.
Figure 3:
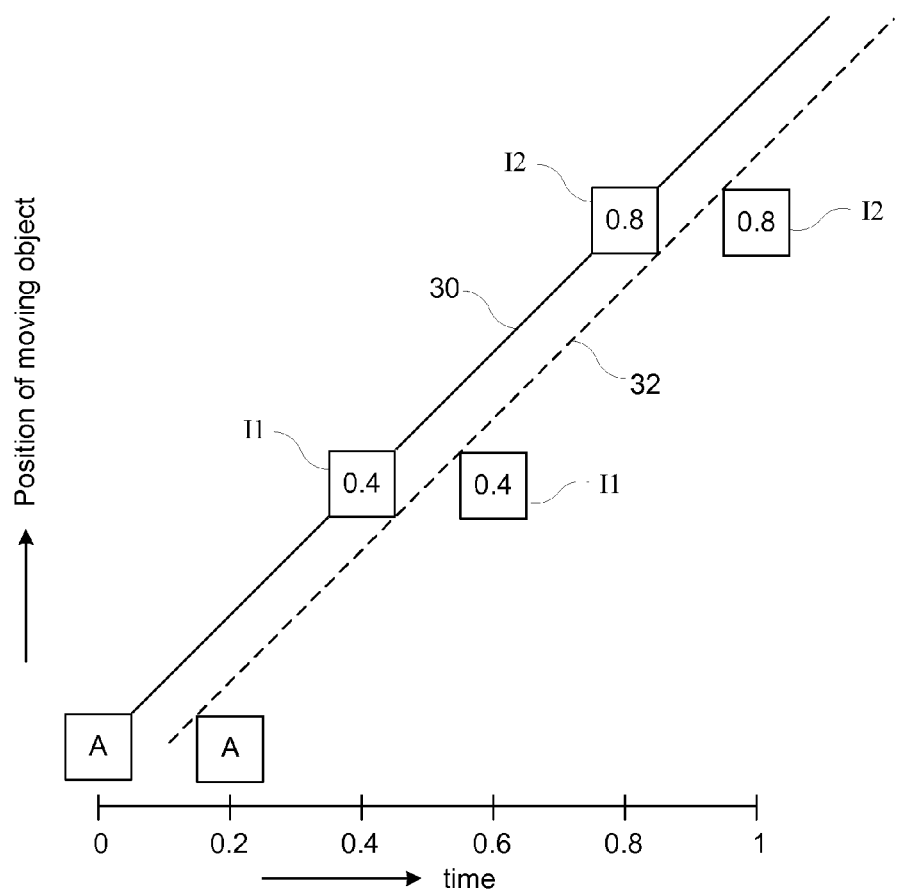
FIG. 3 shows a technique of up-converting the frame rate of film content by calculating intermediate frames at intermediate times between original frames and repeating frames.
Figure 4:
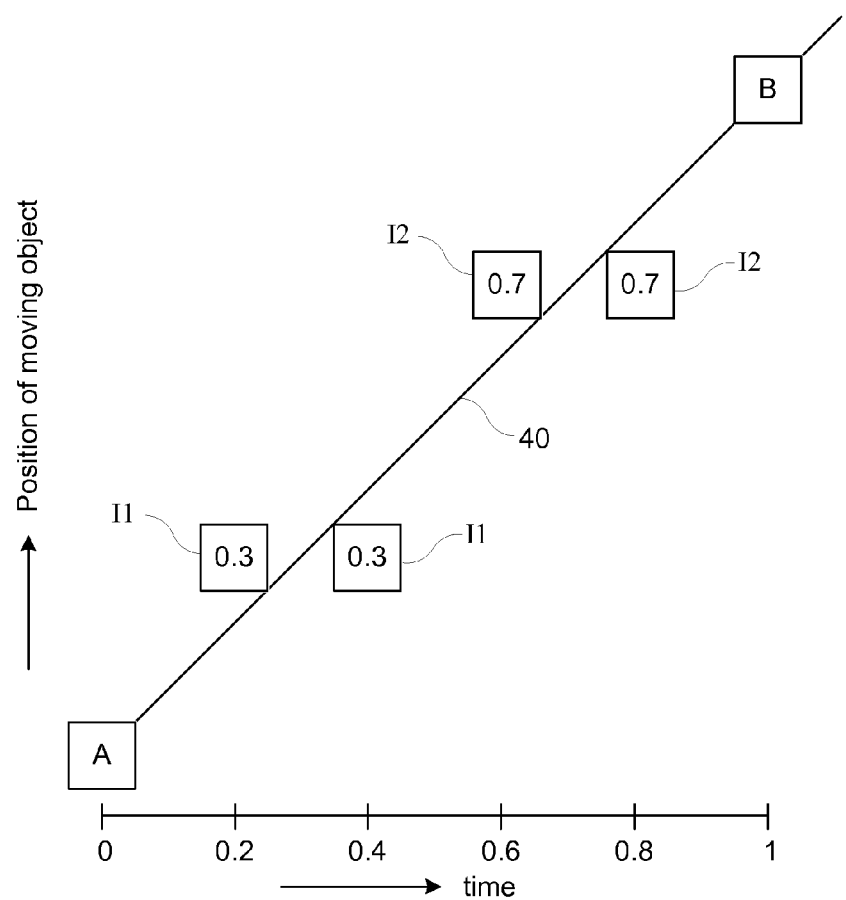
FIGS. 4-6 show techniques for up-converting the frame rate of film content in accordance with embodiments of the present invention.

FIG. 4 shows a first method of up-converting film-based content to a higher frame rate. As in FIG. 2, time is shown along the horizontal axis and the position of a moving object is shown along the vertical axis. For clarity, the horizontal scale is labelled in normalised units 0, 1, 2 etc. For the case where up-conversion is from 24 Hz, the interval 0 . . . 1 represents 1/24 Hz (41.6 ms). Straight line 40 indicates the true path of the moving object. At time t=0 the object is at the position labelled A, in frame A. At time t=1, the object is at the position labelled B, in frame B. The original frames A, B of the film (i.e. the original frames which occurred at the 24 Hz rate) are extracted and displayed. Motion estimation and/or motion-compensation techniques are then applied to calculate two intermediate frames I1, I2. For example, interpolation techniques can be used to calculate the intermediate frames by using the frames A and B. The position of the object is calculated at times 0.3 and 0.7. The actual position of the object at these times should lie along line 40. It can be seen that at time t=0.2, the frame I1 for position t=0.3 is displayed. At time t=0.4, the frame I1 for position t=0.3 is displayed again. At time t=0.6 the frame I2 for position t=0.7 is displayed. At time t=0.8 the frame I2 for position t=0.7 is displayed again. Only two interpolated frames I1, I2 need to be calculated. Each interpolated frame I1, I2 is displayed a first time, slightly before the time for which the position has been calculated, and a second time, slightly after the time for which the position has been calculated. This embodiment outputs a pattern of the form:

A I1 I1 I2 I2 B . . .

where A and B are original frames and I1, I2 are intermediate frames, and B is the first frame of the next repetition of the pattern.

This pattern results in the interpolated frames displaying the object at positions which lie evenly about the straight line 40 which represents the true path of the moving object. Displaying each interpolated frame twice and the original frames once introduces some irregular rest judder. The method requires a reduced amount of computation compared to the full motion compensated up-conversion method shown in FIG. 2, as only two intermediate frames must be computed compared to four frames for the method of FIG. 2. As all originals are shown, the detail flicker will have a higher frequency of 24 Hz instead of 12 Hz and thus will be less visible or annoying to a viewer.

In this embodiment, and the following embodiments, particular values of times are quoted but it will be appreciated that the intermediate frames can be calculated at times which differ slightly from those described and illustrated, without substantially affecting the effect of the invention.

Figure 5:
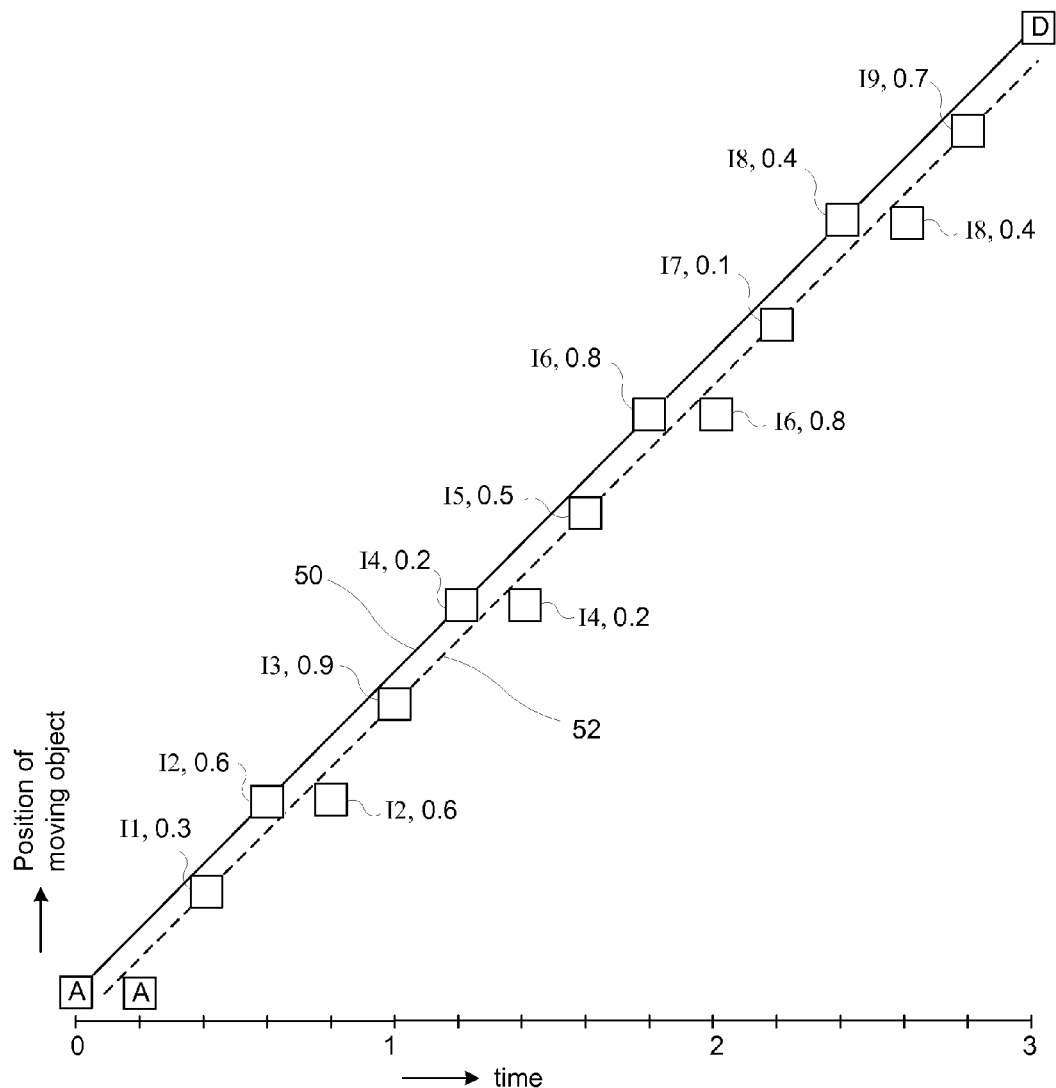

FIG. 5 shows a second method of up-converting film-based content to a higher frame rate. As in previous figures, time is shown along the horizontal axis and the position of a moving object is shown along the vertical axis. Straight line 50 indicates the true path of the moving object. At time t=0 the object is at the position labelled A, in frame A. The original frames A-D of the film are extracted. In this embodiment, not all of the original frames are displayed, but the original frames are used to construct interpolated frames I1-I9. Original frame A is displayed at t=0 and original frame D is displayed at t=3. Frame D is the first frame of the next repetition of the pattern of frames. Motion estimation and/or motion-compensation techniques are used to calculate intermediate frames I1-I9 for a set of temporal positions between frames A and D. A frame is displayed at each 0.2 increment along the time axis. The displayed sequence is a repeating pattern of 1 frame followed by 1 repeated frame (i.e. 121212 . . . ). The original frame A is displayed at t=0 and again at t=0.2. An intermediate frame I1 is displayed at t=0.4. The intermediate frame I1 displayed at t=0.4 is a frame calculated for time t=0.3 as that is the position where the eye expects the object. At t=0.6 an intermediate frame I2 is displayed which has been calculated for time t=0.6 and this frame I2 is repeated at t=0.8. At t=1.0 an intermediate frame is displayed which has been calculated for the time t=0.9. The pattern continues as shown in FIG. 5, with a frame being displayed at increments of 0.2 units, and repetition of alternate frames (1212 etc.). At t=3 original frame D is displayed and the pattern repeats. Only one out of the three original frames are displayed, but intermediate frames are displayed at temporal positions very close to the original frames: a frame calculated for time t=0.9 is displayed at t=1 (the true position of frame B); a frame calculated for time t=1.8 is displayed at t=2 (the true position of frame C). Interpolation techniques can be used to calculate the intermediate frames I1-I9 by using original frames on each side of the temporal position for which the intermediate frame is required. This embodiment outputs a pattern of the form:

A A I1 I2 I2 I3 I4 I4 I5 I6 I6 I7 I8 I8 I9 D D . . .

where A and D are original frames and I1-I9 are intermediate frames and D is the first frame of the next repetition of the pattern.

The pattern of FIG. 5 results in the intermediate frames displaying the object at positions which lie evenly about the straight line 52, which is displaced slightly from the line 50 which represents the true path of the moving object. The usage of a regular repeat pattern reduces the irregular rest judder. This method requires a reduced amount of computation compared to the full motion compensated up-conversion method shown in FIG. 2. The effect of the moved line is to introduce some regular rest judder. Compared to FIG. 4 this method swaps between single/dual image more frequently and therefore the resulting "irregularity" is less annoying.

Figure 6:
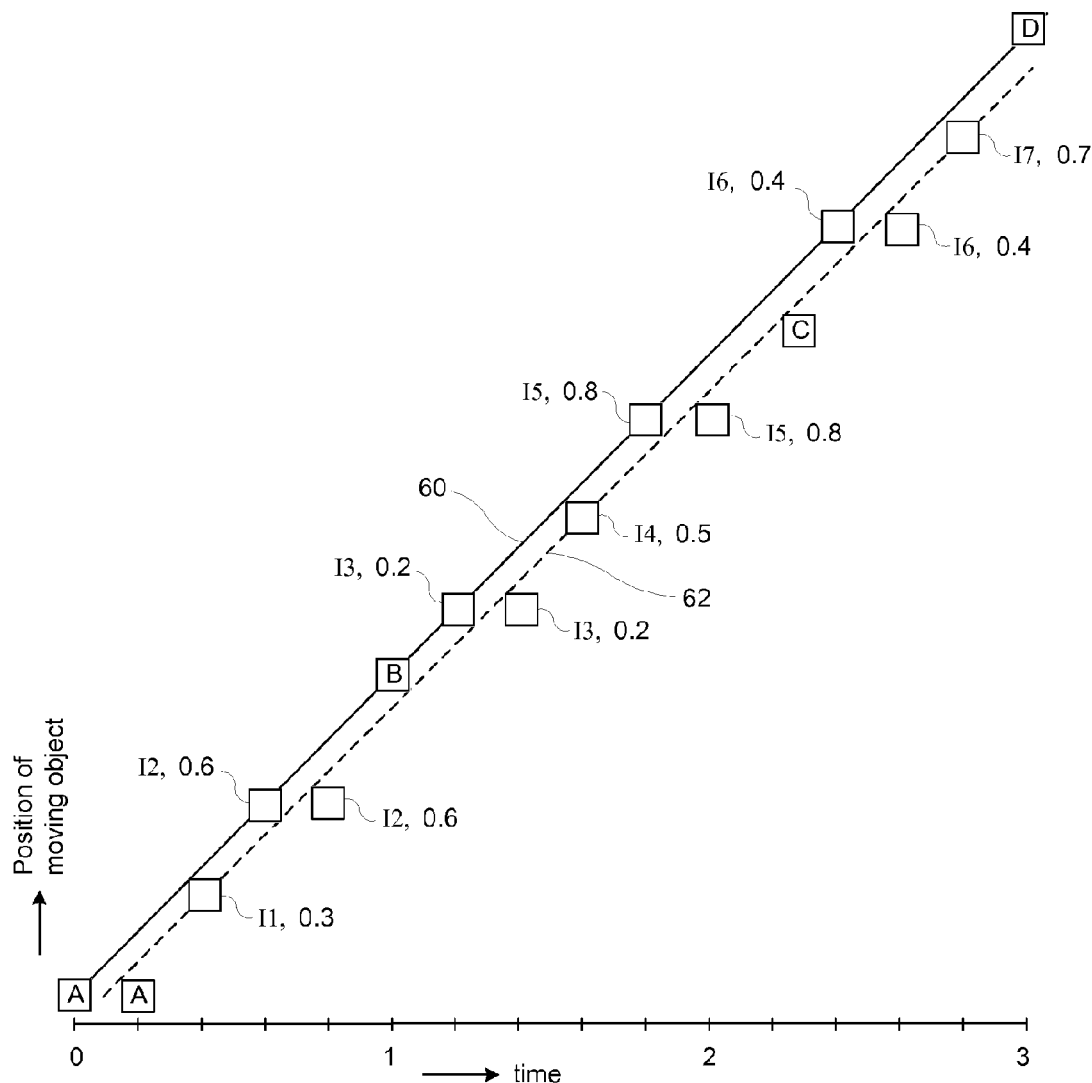

FIG. 6 shows a third method of up-converting film-based content to a higher frame rate. Straight line 60 indicates the true path of the moving object. At time t=0 the object is at the position labelled A, in frame A. All of the original frames A-D of the film are extracted and displayed. Motion estimation and/or motion-compensation techniques are used to calculate intermediate frames I1-I7 for a set of temporal positions between frames A and D. A frame is displayed at each 0.2 increment along the time axis. The displayed sequence is a repeating pattern of one frame followed by one repeated frame (i.e. 121212 . . . ). The original frame A is displayed at t=0 and again at t=0.2. An intermediate frame I1 is displayed at t=0.4. The intermediate frame I1 displayed at t=0.4 is a frame calculated for the temporal position t=0.3. At t=0.6 an intermediate frame I2 is displayed which has been calculated for time t=0.6 which is repeated at t=0.8. At t=1.0 the original frame B is displayed. At t=1.2 an intermediate frame I3 is displayed which has been calculated for time t=0.2. This frame is repeated at t=1.4. At t=1.6 an intermediate frame I4 is displayed which has been calculated for the object being at temporal position t=0.5. At t=1.8 an intermediate frame I5 is displayed which has been calculated for the time t=0.8 and this is repeated at t=2. Original frame C is displayed at t=2.2. The pattern continues as shown in FIG. 5. Original frame D is displayed at t=3 and then the pattern repeats as shown for t=0. As in FIG. 5, frames are displayed at increments of 0.2 units, and frames are calculated for temporal positions at increments of 0.3 units (0.3, 0.6; 0.2, 0.5, 0.8; 0.4, 0.7) and alternate frames are repeated. Interpolation techniques can be used to calculate the intermediate frames I1-I7 by using original frames on each side of the temporal position for which the intermediate frame is required. Stated another way, this embodiment outputs a pattern of the form:

A A I1 I2 I2 B I3 I3 I4 I5 I5 C I6 I6 I7 D D . . .

where A-D are original frames and I1-I7 are intermediate frames and D is the first frame of the next repetition of the pattern.

The pattern of FIG. 6 results in the intermediate frames displaying the object at positions which lie evenly about the straight line 62, which is displaced slightly from the line 60 which represents the true path of the moving object. The regular use of repeating frames reduces the amount of irregular rest judder. This method requires a reduced amount of computation compared to the full motion compensated up-conversion method shown in FIG. 2, and a reduced amount of computation compared to FIG. 5 as only seven intermediate frames (I1-I7) must be computed compared to nine intermediate frames (I1-I9) for the method shown in FIG. 5. Displaying all of the original frames reduces the amount of detail flicker compared to FIG. 5.

Figure 7:
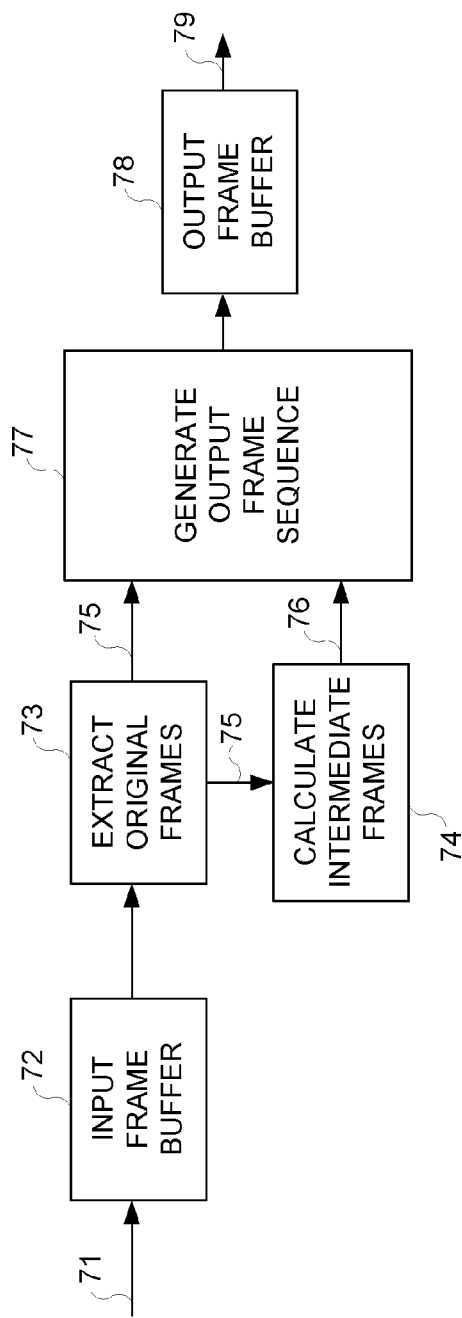
FIG. 7 shows an embodiment of apparatus for performing the method of FIGS. 4-6.

FIG. 7 shows an embodiment of apparatus for performing the method described above. An input 71 receives frames in the form of, for example, progressive scan frames of film content at a rate of 24 Hz or video frames at a rate of 60 Hz. The frames received at input 71 may already be in digital form, or they may be in analog foul and are converted to digital form at the input 71. Received frames are stored in an input frame buffer 72. If the input to frame buffer 72 is at the higher rate, unit 73 extracts original frames from the content. The original frames are forwarded 75 to an output stage 77 and to an intermediate frame calculation unit 74. Various techniques for extracting original frames are known to the skilled person. Unit 74 calculates intermediate frames. Unit 74 can use interpolation techniques, which make use of the original frames 75, or other motion detection and motion compensation techniques which are known to the skilled person. Intermediate frames are calculated at temporal positions as described in FIGS. 4-6. Intermediate frames are forwarded 76 to output stage 77. Output stage 77 constructs an output sequence of frames, making use of original frames 75 and the intermediate frames 76, in the manner shown in FIGS. 4-6. The output sequence is stored in an output frame buffer 78 and delivered to an output 79 at the output frame rate, e.g. 120 Hz, or the output sequence can be output directly without being stored in the output buffer 78.

The apparatus shown in FIG. 7 can form part of a consumer electronics device, such as a television, DVD player, Blu-ray player, media player, set-top box, display, video processing unit, or it can form part of a processing unit in any part of the distribution chain between a content source and a display.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in the claim. Where the system/device/apparatus claims recite several means, several of these means can be embodied by one and the same item of hardware.

The various illustrative logical blocks, modules, circuits, and algorithm steps described above may be implemented as electronic hardware, as software modules executed by a processor, or as combinations of both. To clearly illustrate this interchangeability of hardware and software, various illustrative components, blocks, modules, circuits, and steps have been described above generally in terms of their functionality. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the described functions. A general-purpose processor may be a microprocessor, a conventional processor, a controller, a microcontroller, or a state machine. A processor may also be implemented as a combination of computing devices, e.g., a combination of a DSP and a microprocessor, a plurality of microprocessors, one or more microprocessors in conjunction with a DSP core, or any other such configuration.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium.

In the description above, and with reference to the Figures, there is described a method and apparatus for up-converting content comprising a sequence of original frames at a first frame rate. Up-conversion is to a second, higher, frame rate. Intermediate frames are calculated for temporal positions spaced between temporal positions of the original frames. An output sequence at the second frame rate comprises: at least one original frame; at least one intermediate frame which is repeated; and at least one frame which is not repeated. The method is suitable for applications where an odd up-conversion factor is required in the frame rate, such as an up-conversion factor of five to up-convert from the 24 Hz frame rate used for film-based content to the 120 Hz frame rate used by displays. The output sequence can use all of the original frames to reduce detail flicker.

Although the present invention has been illustrated and described with respect to several preferred embodiments thereof, various changes, omissions and additions to the form and detail thereof, may be made therein, without departing from the spirit and scope of the invention.

What is claimed is:

1. A method of increasing the frame rate of content, the content comprising a sequence of original frames, including a first original frame, a second original frame, a third original frame, and a fourth original frame, at a first frame rate, the method comprising:
    receiving the original frames;
    calculating intermediate frames for temporal positions spaced between the temporal positions of the original frames;
    outputting a sequence of frames at a second frame rate, higher than the first frame rate, wherein the output sequence comprises a repeating pattern of frames and, within each repetition of the pattern, there is:
    at least one original frame;
    at least a first intermediate frame calculated from at least two consecutive original frames, the first intermediate frame being repeated by at least a second intermediate frame that is identical to the first intermediate frame; and
    at least a second intermediate frame that is not repeated.

2. A method according to claim 1 wherein the second frame rate is an odd integer multiple of the first frame rate.

3. A method according to claim 2 wherein the second frame rate is five times higher than the first frame rate.

4. A method according to claim 3 wherein the first frame rate is 24 Hz and the second frame rate is 120 Hz.

5. A method according to claim 1 wherein the outputting the sequence of frames comprises outputting all of the original frames.

6. A method of increasing the frame rate of content, the content comprising a sequence of original frames, including a first original frame, a second original frame, a third original frame, and a fourth original frame, at a first frame rate, the method comprising:
    receiving the original frames;
    calculating intermediate frames for temporal positions spaced between the temporal positions of the original frames;
    outputting a sequence of frames at a second frame rate, higher than the first frame rate, wherein the output sequence comprises a repeating pattern of frames and, within each repetition of the pattern, there is:
    at least one original frame; and
    at least one intermediate frame calculated from at least two consecutive original frames, each intermediate frame being repeated by at least a second intermediate frame that is identical to the first intermediate frame.

7. A method according to claim 1 wherein the step of outputting the sequence of frames comprises an alternating sequence of repeating a frame and outputting the next frame only once.

8. A method according to claim 7 wherein for each intermediate frame that is repeated, the intermediate frame is calculated for a temporal position at which at least one occurrence of the intermediate frame will be output.

9. A method according to claim 1 further comprising receiving a sequence of frames at a frame rate higher than the first frame rate and extracting the original frames at the first frame rate.

10. A method according to claim 9 wherein the sequence of frames at a frame rate higher than the first frame rate comprise a sequence of frames which have been up-converted using a 3:2 pull down process.

11. A method according to claim 6 wherein the second frame rate is five times higher than the first frame rate, the step of calculating intermediate frames calculates two intermediate frames between each adjacent pair of original frames, and the step of outputting the sequence of frames comprises repeating each intermediate frame and outputting each original frame only once.

* * * * *